Dec. 17, 1935.  H. L. SMITH  2,024,309
KNIFE STABILIZER FOR MOWERS AND REAPERS
Filed Aug. 31, 1934
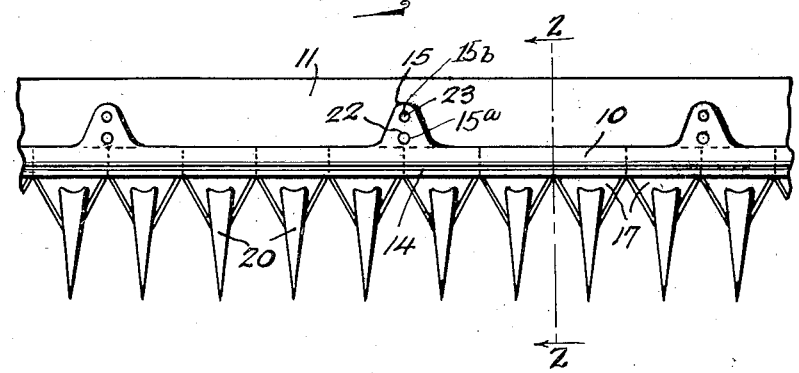
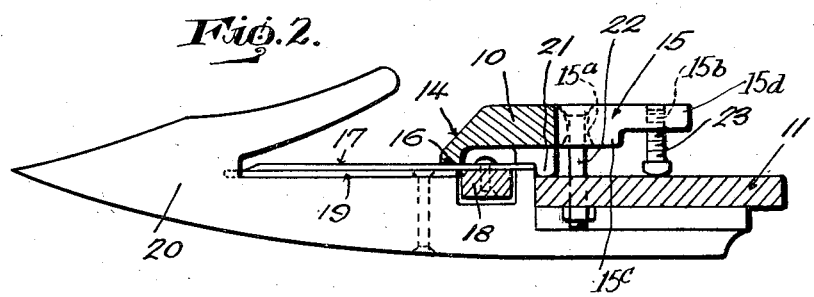
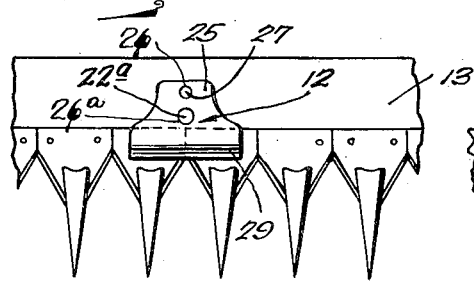
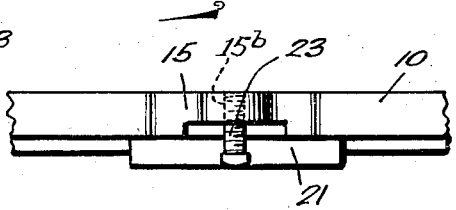
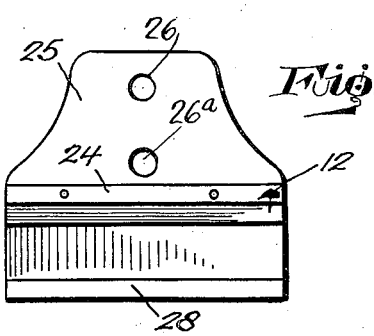
Inventor
Howard L. Smith
By Geo. P. Kimmel
Attorney Patented Dec. 17, 1935

2,024,309

UNITED STATES PATENT OFFICE 2,024,309

KNIFE STABILIZER FOR MOWERS AND REAPERS

Howard L. Smith, Lexington, Ky.

Application August 31, 1934, Serial No. 742,316

3 Claims. (Cl. 56—305)

My present invention relates generally to the cutting mechanisms of mowing and harvesting machines utilizing a reciprocating knife bar in connection with a cutter bar and normally open to the objectionable vibration of the knife bar, especially after some wear of the parts in use, which not only promotes excessive noises, but impairs to a considerable extent the efficiency of the cutting operation.

In order to remedy the above, my invention has for its primary object the provision of simple and inexpensive means adjustable at all times to steady the knife bar in its movement, and in the following detailed description of its various parts, operation and advantages, I will make plain the best mode so far devised for carrying my invention into practice.

Reference is made to the accompanying drawing, which forms a part of this specification, and in which Figure 1 is a partial top plan view of a cutter bar equipped with my invention in its preferred form.

Figure 2 is an enlarged vertical section taken transversely therethrough substantially on line 2—2 of Figure 1.

Figure 3 is a partial rear elevation of the knife clamp shown in Figures 1 and 2.

Figure 4 is a partial top plan view showing a modified form of knife clamp, and, Figure 5 is a detailed bottom plan view of the knife clamp shown in Figure 4.

Referring now to these figures, my invention may take either the form of a continuous clamping bar 10 shown in Figures 1 to 3 inclusive, extending the major portion of the length of the cutter bar 11, or a series of spaced apart clamping members 12, one of which is shown in Figures 4 and 5, distributed along the cutter bar 13.

The clamping bar 10 of Figures 1 to 3 inclusive presents a downwardly sloping upper front surface 14 and a series of spaced apart rearwardly projecting lugs 15. The lower surface of the bar has a flat downwardly facing longitudinal front edge 16 which seats on the knife blades 17 forwardly of the riveted connections of these blades with the knife bar 18, and with just sufficient pressure to steady the same and prevent the usual vibrations, and at the same time maintaining efficient contact of the blades 17 with the ledger plates 19 carried by the guard fingers 20 of the cutter bar 11.

Moreover adjacent to the lugs 15, the bottom surface of the bar 10 has rear depending ribs 21 formed of front parts and rear parts of greater height than the front parts. The parts of different heights are provided by rabbeting the lower ends of the ribs. The front parts of the ribs oppose the rear of the upper surface of blades 17. The high parts of the ribs oppose the rear edges of the blades 17 and at their lower edges rest upon the forward portion of the upper surface of the cutter bar 11 at spaced points therealong. These ribs being between the front edges of the clamping bar 10 and the adjustable connections thereof with the cutter bar through the lugs 15, thus form fulcrum points upon which the blade engaging edge 16 of the bar may be adjusted in accordance with wear of the parts.

Each of the lugs 15 has a front vertical opening 15a for the reception of an anchoring bolt 22 depending through the cutter bar 11 and is also provided rearwardly of its bolt opening with a rear opening 15b for an adjusting screw 23 threaded vertically therethrough and bearing at its lower end upon the upper face of the cutter bar 11. It will be understood that sufficient play is provided around the bolts 22 so that by turning the adjusting screws 23 down, the lugs 15 will be raised and the forward blade engaging edge of the bar will be lowered to compensate for wear and for this purpose the wall of opening 15a gradually increases in diameter from its transverse median to each end thereof, as is shown in dotted lines, Figure 2. The lugs 15 have forward and rear portions 15c, 15d respectively. The forward portions are of greater thickness than and depend with respect to the lower faces of the rear portions. The said forward portions 15c are flush with the upper face of bar 10. The openings 15a, 15b are arranged respectively in the portions 15c, 15d.

Since the ribs 21 depend from the bar adjacent to the lugs 15 only, any refuse of the cutting operation, or any dirt or gravel finding its way beneath the clamping bar 10 will be shifted by the reciprocating knife bar and readily find its way rearwardly between the ribs onto the cutter bar 11 from which it will be discharged and it is obvious that by having the clamping bar 10 substantially continuous along the knife bar, according to Figures 1 to 3 inclusive, the sloping or bevelled front surface 14 works against the grass or grain to be cut so as to eliminate the shifting or dancing of the cut stalks on the knives and protect the knives from gums or wax deposits of weeds, grass or grain.

In the described form of my invention, I have shown the pendant fulcrum ribs 21 formed integral with the clamping bar, but they may be attached as I have shown the rib 24 in the individual clamp form of my invention in Figures 4 and 5. In the latter form, each clamp 12 has a rearwardly projecting lug 25 formed with a forward opening 26a for one of the cutter bar bolts 22a and with a rear opening 26 for an adjusting screw 27. Each clamp 12 is also formed with a lower forward knife engaging edge portion 28, and a bevelled front face 29 and is thus a counterpart of one of the portions of the clamping bar 10 adjacent to one of its lugs 15. Thus the adjustable clamping action of the clamping member is the same in both forms, though some of the protecting features before mentioned with respect to the clamping bar 10 are not present where the adjustable clamping for the elimination of vibrations is accomplished by means of a series of clamps 12 as in Figures 4 and 5.

What I claim is:

1. In a knife stabilizer for mowers and reapers having a reciprocating cutter bar mechanism, a clamp comprising a body part formed with a rearwardly extending lug, said body part at the front of its lower face being formed with a depending portion adapted to have its lower edge bear against the upper face of the knife at a point spaced forwardly of the rear edge of the latter, said body part at the rear end of its lower face being formed with a depending rib having a front portion adapted to bear against the rear part of the upper face of the knife and a rear portion adapted to bear upon the cutter bar and oppose the rear edge of the knife, said rear portion constituting a fulcrum for said body part, said lug being formed with a front and a rear opening, a coupling connection loosely extending through said front opening and adapted to be connected to the cutter bar, and a vertically movable adjusting element for the clamp threadedly engaging with the wall of said rear opening and adapted to seat on the cutter bar.

2. In a knife stabilizer for mowers and reapers having a reciprocating cutter bar mechanism, a clamp comprising a body part formed with a rearwardly extending lug, said body part at the front of its lower face being formed with a depending portion adapted to have its lower edge bear against the upper face of the knife at a point spaced forwardly of the rear edge of the latter, said body part at the rear end of its lower face being formed with a depending rib having a front portion adapted to bear against the rear part of the upper face of the knife and a rear portion adapted to bear upon the cutter bar and oppose the rear edge of the knife, said rear portion constituting a fulcrum for said body part, said lug being formed with a front and a rear opening, a coupling connection loosely extending through said front opening and adapted to be connected to the cutter bar, a vertically movable adjusting element for the clamp threadedly engaging with the wall of said rear opening and adapted to seat on the cutter bar, and said lug having its rear portion of less height than its front portion, said front and rear openings being arranged respectively in said front and rear portions of said lug, the said front portion of said lug depending below the rear portion of the latter and being flush with the top and bottom of said body part.

3. In a knife stabilizer for mowers and reapers having a reciprocating cutter bar mechanism, a clamp comprising a body part formed with a rearwardly extending lug, said body part at the front of its lower face being formed with a depending portion adapted to have its lower edge bear against the upper face of the knife at a point spaced forwardly of the rear edge of the latter, said body part at the rear end of its lower face being formed with a depending rib having a front portion adapted to bear against the rear part of the upper face of the knife and a rear portion adapted to bear upon the cutter bar and oppose the rear edge of the knife, said rear portion constituting a fulcrum for said body part, said lug being formed with a front and a rear opening, a coupling connection loosely extending through said front opening and adapted to be connected to the cutter bar, and a vertically movable adjusting element for the clamp threadedly engaging with the wall of said rear opening and adapted to seat on the cutter bar, the wall of said front opening gradually increasing in diameter from its transverse center to each end thereof, the said coupling connection including a head seated in the upper end of said front opening.

HOWARD L. SMITH.